United States Patent [19]

Paget et al.

[11] Patent Number: 4,467,137

[45] Date of Patent: Aug. 21, 1984

[54] CABLE BREAKOUT ARTICLE

[75] Inventors: Jonathan Paget, Swindon; David H. Thomas, Inkpen, both of England

[73] Assignee: Raychem Limited, London, England

[21] Appl. No.: 390,715

[22] Filed: Jun. 21, 1982

[30] Foreign Application Priority Data

Jun. 22, 1981 [GB] United Kingdom ............... 8119242
Oct. 14, 1981 [GB] United Kingdom ............... 8131053

[51] Int. Cl.³ .................... H02G 13/06; H01R 4/00; B29C 27/00; H01B 13/06
[52] U.S. Cl. ................................. 174/87; 174/88 R; 174/DIG. 8; 156/49; 156/56; 156/86; 428/36
[58] Field of Search .................. 428/36; 174/DIG. 8, 174/74 A, 87, 88 R, 92; 156/49, 86, 56

[56] References Cited

U.S. PATENT DOCUMENTS

| | | | |
|---|---|---|---|
| 2,027,962 | 1/1936 | Currie | 156/212 |
| 3,086,242 | 4/1963 | Cook et al. | 264/109.1 |
| 3,236,934 | 2/1966 | Revelle et al. | 174/88 R |
| 3,455,336 | 7/1969 | Ellis | 174/DIG. 11 |
| 3,597,372 | 8/1971 | Cook | 525/101 |
| 4,035,534 | 7/1977 | Nybers | 428/516 |
| 4,135,553 | 1/1979 | Evans et al. | 428/36 |
| 4,179,320 | 12/1979 | Midgley et al. | 428/36 |
| 4,181,775 | 1/1980 | Corke | 428/36 |
| 4,298,415 | 11/1981 | Nolf | 174/DIG. 8 |
| 4,343,844 | 8/1982 | Thayer et al. | 174/DIG. 8 |

FOREIGN PATENT DOCUMENTS

| | | | |
|---|---|---|---|
| 1165122 | 3/1964 | Fed. Rep. of Germany | 174/74 A |
| 1242540 | 8/1960 | France | 174/74 A |
| 1109105 | 4/1968 | United Kingdom . | |
| 1150875 | 5/1969 | United Kingdom . | |
| 1155470 | 6/1969 | United Kingdom . | |
| 1206273 | 1/1972 | United Kingdom . | |
| 1308358 | 2/1973 | United Kingdom . | |
| 1428134 | 3/1976 | United Kingdom . | |
| 1444927 | 8/1976 | United Kingdom . | |
| 1454838 | 11/1976 | United Kingdom . | |
| 1506242 | 4/1978 | United Kingdom . | |
| 1531089 | 11/1978 | United Kingdom . | |
| 2005090 | 4/1979 | United Kingdom . | |
| 2083403 | 3/1982 | United Kingdom . | |

Primary Examiner—William R. Dixon, Jr.
Attorney, Agent, or Firm—T. Gene Dillahunty; Edith A. Rice; Herbert G. Burkard

[57] ABSTRACT

A cable breakout article (78) which is formed of a polymeric material and which is preferably heat-recoverable comprises a body portion and at least two tubes or outlet portions (91 to 94) leading from apertures in the body portion. The length and flexibility of the tubes (91 to 94) is such that at least one of them can be bent away from the other(s) to allow operations such as heat recovery to be carried out on an end portion of one of the tubes in isolation from the others.

Preferably one or more of the tubes (95) is corrugated at least near its end adjacent to the body portion (78) so as to assist bending.

35 Claims, 5 Drawing Figures

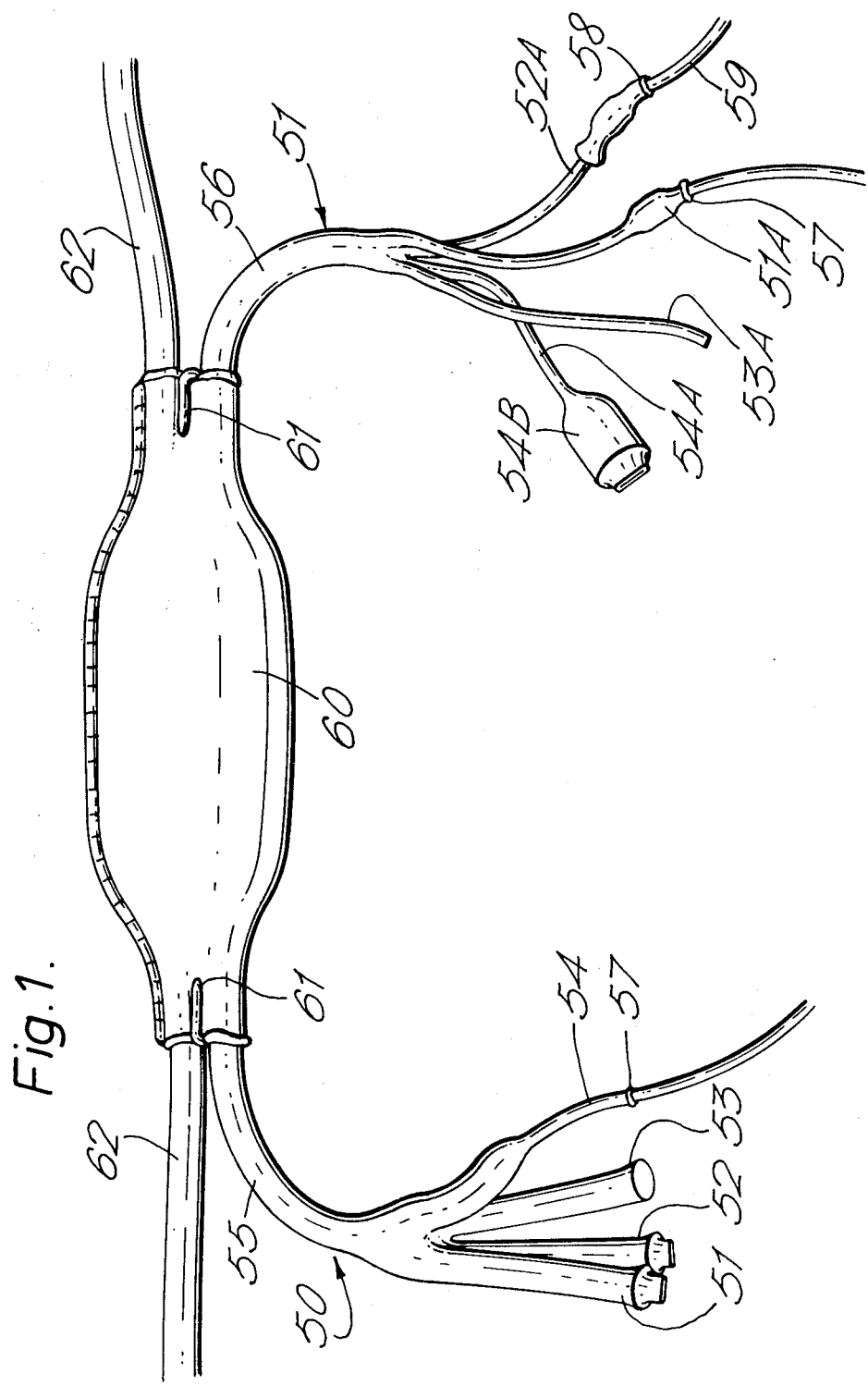

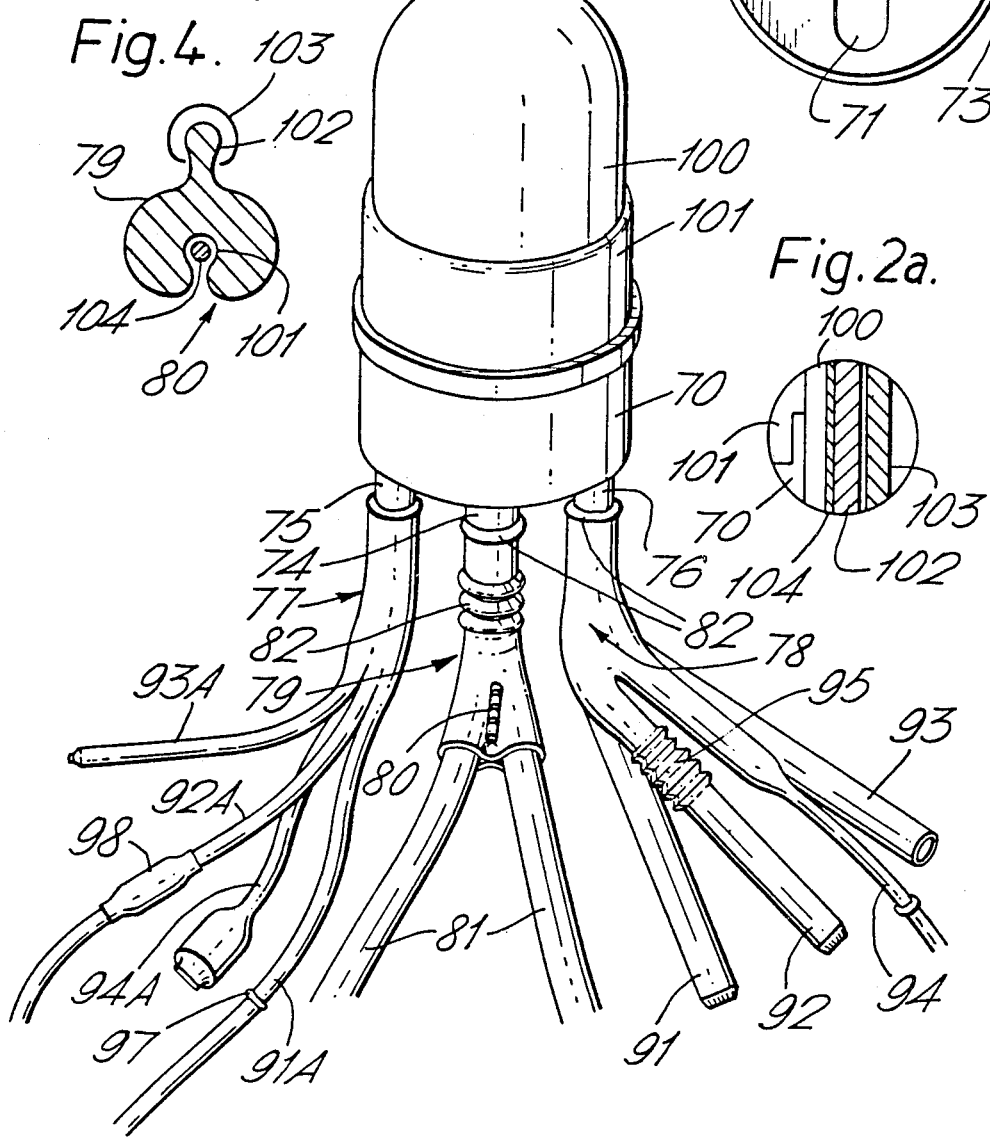

CABLE BREAKOUT ARTICLE

This invention relates to an article formed of polymeric material comprising a body portion and at least two tubes leading from apertures in the body portion and to the use of such an article in cable breakouts and to methods of making such articles and methods of making such cable breakouts. Preferably the articles are at least partly made of electrically insulating polymeric material and are at least partly heat recoverable.

A heat recoverable article is an article the dimensional configuration of which may be made substantially to change when subjected to heat treatment.

Usually these articles recover, on heating, towards an original shape from which they have previously been deformed but the term "heat-recoverable", as used herein, also includes an article which, on heating, adopts a new configuration, even if it has not been previously deformed. In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-stable form but, in other applications, a preformed dimensionally heat stable article is deformed to a dimensionally heat unstable form in a separate stage.

One manner of producing a heat-recoverable article comprises moulding the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, (equivalent U.S. Pat. No. 4,035,534) an elastomeric member such as an outer tubular member is held in a stretched state by a second member, such as an inner tubular member, which, upon heating weakens and thus allows the elastomeric member to recover.

Cable breakouts using heat recoverable wraparound sleeves are known, for example from British Patent Specification No. 2019120 (equivalent U.S. Pat No. 4,298,415). Another known form of cable breakout is the so called sleeve 31a cannister used for radial distribution of individual pairs of telephone wires from a given location along a main cable to several individual telephone receivers. In this arrangement, the main cable passes into and out of the domed cannister through a hole in the bottom of the cannister and the pairs to be separated out are led out of the cannister through further holes in the bottom thereof.

A somewhat unreliable moisture proofing seal is usually made by filling the holes with a suitable thermoplastic compound, and the cannister itself has a removable top portion which is connected to the bottom portion by a mechanical clamping ring.

The present invention provides articles and assemblies which can be used greatly to improve the reliability of the aforementioned 31a type breakout and which are adaptable to many other forms of cable breakout.

The invention accordingly provides, in one aspect, an article formed of polymeric material as an integral unit comprising a body portion and at least two tubes leading from apertures in the body portion, wherein the length and flexibility of the tubes is such that at least one of the tubes can be bent away from the other tube(s) to an extent permitting operations to be carried out at least on an end portion of a selected one of the tubes substantially in isolation from the other tube(s).

In another aspect, the invention provides an article comprising a body portion and at least two tubes leading from apertures in the body portion, wherein at least part of at least one of the tubes is formed of polymeric material and is in a temporarily stable expanded state from which it is recoverable towards an unexpanded state, and the length and flexibility of the tubes is such that at least the said one of the tubes can be bent away from the other tube(s) to an extent permitting operations to effect recovery of an expanded part of a selected one of the tubes to be carried out substantially in isolation from the other tube(s).

Although a flat body with the tubes extending from holes therein may be useful for some purposes, the body is preferably in the form of a hollow shell capable of receiving the relevant cable, and the tubes serve as outlets from the body. In either case, it has been found preferable for the tubes when unflexed to be substantially side-by-side, preferably substantially parallel to one another, and in practice there will usually be at least two tubes of substantial length which can each be bent away from the other as aforesaid. This has been found advantageous for esthetics and convenience, especially when the body portion is tubular and the tubes extend from one end thereof and substantially in-line therewith, symmetrical arrangement about the tubular axis of the body being preferred.

Preferably at least part of every outlet is formed of polymeric material and is in the expanded state and the length and flexibility of the outlets is such that any one of the outlets can be bent away from the other outlet(s) to the said extent. This article is preferably formed as an integral unit, although assembly of separate body and outlet portions may be convenient for some purposes.

This unusual provision of relatively long and flexible outlet tubes is advantageous since it can provide an electrical insulation component the tubular legs of which are long enough and flexible enough at normal wall thicknesses to be readily bent away from each other so that operations can be performed on one of the legs without materially affecting the other legs. This is especially useful in heat recoverable articles, since one of the legs can be recovered about a cable portion passing therethrough while leaving the other leg or legs unrecovered for use at some time in the future. It is thought that the experienced worker in this field of technology will have no difficulty in judging when the length and flexibility of the legs are sufficient for the specified purposes.

Advantageously, the outlet portions may be corrugated at least near the end adjacent to the body portion so as to assist bending of any selected outlet portion away from the others for recovery in use. Preferably the corrugations are arranged to enable the corrugated portion to be bent at least 90° without blocking the internal outlet passage.

It is usually convenient for the recoverable articles of the kind in question to have outlets of substantially uniform average internal diameter over all or most of the outlet length, preferably including any corrugated portion.

Whether or not it is in the expanded state, the uniform part of the outlet preferably has a length to average internal diameter ratio of at least 10:1, preferably at 20:1, and especially greater than 30:1. Such ratios are not readily obtainable in the more useful sizes (e.g. for recovery about a single pair telephone drop wire cable) by standard moulding techniques previously used for producing heat recoverable cable breakout covers. This is because of the limitations imposed by the inevitable increase in flexibility with increasing length of the support pins normally used as internal supports for moulding tubular objects, length to unexpanded internal diameter ratios of 20:1 being the maximum attainable in practice. Expansion ratios of at least 2:1 are normally required, and it will thus be observed that moulding techniques can be used only to produce relatively less useful products having expansion ratios of less than 2:1. Blow moulding is accordingly the preferred production technique for the articles of this invention. The preferred conformation of the articles in question comprises a substantially tubular body portion, which may be of circular or other cross section, with the outlet portions extending from an end of the body portion substantially parallel with the tubular axis thereof.

Other arrangements can be envisaged and the outlet portions may be attached to a body portion which is longitudinally slit so as to be wrappable around the main cable from which portions are to be broken out, suitable closure systems for such wraparound devices being described, for example, in U.S. Pat. No. 3,455,336.

According to another aspect of the present invention there is provided an enclosure comprising a housing capable in use of receiving part of a cable from which one or more portions are to be divided out, and an article formed of polymeric material comprising a body portion attached to the housing and at least two tubes leading from apertures in the body portion, wherein the length and flexibility of the tubes is such that at least one of the tubes can be bent away from the other tubes(s) to an extent permitting operations to be carried out at least on an end portion of a selected one of the tubes substantially in isolation from the other tube(s).

The said article is preferably as described above and may have its body end enclosed in or attached to a housing of known type, for example a wraparound heat recoverable sleeve as described in U.S. Pat. No. 3,455,336, or a housing similar to the aforementioned sleeve 31a cannister. In the latter case it is preferred for convenient attachment that the cannister be modified with short tubular projections from the outlet holes so as to facilitate connection of the outlet article, preferably by recovering the recoverable body portion thereof on to the projections although attachment by adhesive or other means with or without recovery could be convenient in some circumstances.

The housing, which is preferably dimensionally heat stable (that is not heat shrinkable), preferably has an aperture in its base or wall to permit entry and exit of a portion of the cable from which breakouts are to be made. This entry-and-exit hole may conveniently be placed in the base of a cylindrical housing between two outlet holes which are preferably present each preferably leading to a four legged breakout article as described above.

The legs of the breakout articles may enclose pre-installed wires and the end of a given leg may be expanded (relative to the remainder of the leg) as described above to facilitate tucking in of connections subsequently made to a cable portion passing through the leg, followed by recovery of the end portion of the leg.

The invention also provides a method of making a cable breakout wherein a cable portion is led off through a said tube of an article as described above or a connection is made to the free end of a cable portion extending through such a tube, that tube is isolated from the other tube(s) of the said article by bending the one or the other(s) to an extent permitting operations to be carried out at least on an end portion of that tube substantially in isolation from the other tube(s), and operations are thereafter carried out on a portion of that tube substantially in isolation from the other tube(s) to seal the tube around the relevant cable portion and/or the said connection.

It is usually advantageous to recover the recoverable outlet portions individually by flexing the one to be recovered away from the other or others so as to avoid accidental recovery of the other or others.

This is especially useful when heat recoverable articles are used, in which case the use of a heat shield, for example a sheet of heat resistant material to be placed between the outlet portion to be recovered and the other or others, may be rendered unnecessary. If desired, a further heat recoverable article such as a sleeve may be recovered over the end of the outlet.

The preferred process for making the breakout articles according to the present invention comprises providing a parison of polymeric material, blowing the parison in an appropriate mould to produce the desired article either with the tubes initially separate from each other, or with the tubes initially joined together to be separated subsequently, and cross-linking the polymeric material. Preferably the process also includes expanding at least part of the or each article to a temporarily stable expanded state from which it is recoverable towards an unexpanded state. The operations of this method may be carried out in any appropriate order.

Alternatively, the article may formed by fusing together portions of two superposed sheets or a doubled over single sheet of polymeric material. Preferably, cross linking is carried out by irradiation before the expansion step which can then be carried out at a temperature above the crystalline melting point of the polymer in a known manner, but cold expansion before the cross linking step (and preferably also before the fusing step) could also be used if convenient. Cold expansion means expansion at a temperature below the crystalline melting point or softening point of the polymeric material in question.

Breakout articles according to the invention which have the outlet tubes lying substantially in line with a tubular body portion may be made more conveniently by the flow moulding technique, whereas articles having three or more outlet tubes lying side by side in substantially one plane can be conveniently produced also by the fusing technique to provide a series of breakout articles which can then be separated by cutting.

It is preferred to form the articles with more than two outlet tubes arranged in a non linear substantially symmetrical pattern, for example, a triangular (for three outlets) or square (for four outlets) pattern, about the tubular axis of the tubular body portion. This can result in a visually more attractive product than the aforementioned substantially planar arrangement of the outlets. The resulting article can then be expanded, for example by heating to a temperature above the crystalline melting point of the polymeric material in question, stretching on suitable mechanical means inserted in the article, cooling in the stretched state to a temperature below the crystalline melting point of the polymeric material, and removal of the mechanical means.

Alternatively, the recoverable articles according to the invention may be made by assembling separate parts.

The invention also provides a kit of parts for making cable breakouts comprising a heat recoverable wraparound sleeve and a breakout article as described above.

The invention also provides a kit of parts for making a cable breakout comprising a substantially dimensionally stable housing capable of receiving a portion of a cable and having at least one outlet hole through which conductors may be led off from the cable, and comprising at least one article as described above. Preferably the breakout article is attached to the said outlet hole. The preferred housing comprises two portions which are assemblable to enclose the cable portion from which conductors are led off in use, and the kit preferably also comprises a recoverable sealing member for sealing the joint between the two housing portions.

Some specific embodiments of the present invention will now be described by way of example with reference to the accompanying drawings wherein:

FIG. 1 illustrates an embodiment of the invention in which breakout articles having the outlet portions substantially in line with the main axis of the body portion are connected with a housing, in this case a wraparound heat recoverable sleeve, which receives the main cable.

FIG. 2 illustrates an embodiment of this invention in the form of a distribution enclosure.

FIG. 2a shows a cross section of the wall of the distribution enclosure.

FIG. 3 illustrates the lower part of the distribution enclosure.

FIG. 4 shows a cross section of an "omega" type sealing means.

For convenience of illustration, the four outlets 51 to 54 are shown to the left of the drawing in the form which might be used when no pre-installed drop wires are present, and are shown as 51a, 52a, 53a, and 54a to the right of the drawing in the form which might be used when pre-installed drop wires are present. Although other arrangements of the outlet portions could be used if desired, it is usually convenient and visually attractive to have them lying substantially parallel with the main axis of the body portion, the flexibility of the long outlet portions according to this invention being sufficient to accommodate leading off of the drop wires in different directions in addition to making possible the individual recovery by heating of the respective outlet portions without the need for bothersome heat shielding arrangements to prevent accidental recovery of the outlet portions adjacent to the one being recovered.

Outlet portions 51 and 52 are shown with closed ends, which are preferably thus formed during manufacture of the breakout article, but may be pinched closed after initial formation with open ends if the resulting seal is strong enough for the intended use of the article; outlet portion 53 is shown with the closed end cut away ready to receive a breakout portion of the main cable; and outlet portion 54 is shown recovered onto a breakout cable portion, containing a pair of drop wires, with a sealing hot melt adhesive 57 exuding from the end of the recovered outlet portion 54.

On the right hand side of the figure, outlet portion 51a is shown after connection of pre-installed drop wires contained therein to a lead off cable 56 with hot melt adhesive 57 to effect sealing as before; outlet portion 52a is shown similarly after connection of the pre-installed drop wires to a lead off cable portion 59 with a small heat-recoverable sleeve 58 effecting the necessary sealing between the outlet portion and the lead off; outlet portion 53a is as supplied ready for use with a closed end concealing the pre-installed drop wires to protect them from contamination prior to use; and outlet portion 54a is shown with an enlarged end portion 54b to accommodate tucking in of the connection to be made between the pre-installed drop wires and a lead off cable portion in use, followed by recovery of the end portion 54b to enclose and seal the connection.

The body portions 55 and 56 of the breakout articles 50 and 51 are respectively received in the opposite ends of a heat-recoverable sleeve 60 with a clip 61 at each end to ensure an adequate seal of the sleeve 60 around the main cable 62 and the breakout articles 50, 51. Wraparound heat recoverable sleeves with sealing clips of this kind are known generally from British Patent Specification No. 2019120. (equivalent U.S. Pat. No. 4,298,415).

Fig. 2 shows the improvement according to the present invention of the known "Sleeve 31A". Post Office Distribution Enclosure. In this arrangement, a housing 70 corresponding to the lower half of the known 31A enclosure has holes 71, 72 and 73 (see plan view FIG. 3), the hole 71 permitting entry and exit of the main cable and holes 72 and 73 permitting exit of the breakout portions of the cable. This housing may be moulded or otherwise formed of water-resistant polymeric material.

In this modification, the holes 72 and 73 are provided with extensions 75 and 76 (FIG. 2) onto which breakout articles 77, 78 according to the present invention can be shrunk, each having four outlet portions to accommodate a total of 8 pairs of drop wires for point distribution to individual telephone receivers. A heat recoverable sleeve 79 is shown recovered onto an extension 74 of hole 71 (FIG. 3) with a means 80, to be described in more detail below, to seal between the entry and exit of the main cable 81. Corrugations 82 are provided to facilitate flexing of the sleeve 79 during and after installation.

The sealing means 80 preferably comprises opposed male and female mating portions 101, 102 formed in opposable portions of the tubular sleeve 79, as shown in FIG. 4 in schematic cross-section. After mating of these portions, a retaining member 103 is preferably applied. A holding member 104 is preferably provided in the male portion 102 to strengthen the resulting seal. Sealing means of this "omega" or "nipple" kind are described and claimed in copending British patent application No. 8119243 and U.S. Ser. No. 390,456 filed June 21, 1982.

Hot melt adhesive 83 is again shown effecting a good seal between the breakout articles and the extensions. The outlet portions 91, 92, 93 and 94 substantially correspond to the outlet portions 51, 52, 53 and 54 of FIG. 1, and outlet portions 91a, 92a, 93a and 94a substantially correspond to outlet portions 51a, 52a, 53a and 54a of FIG. 1. Outlet 92 illustrates the preferred corrugations 95, which may of course be present on all the outlet legs.

The closure dome 100 of the housing, which is attached to the lower part 70 of the housing by means of a clamping ring in the previously known 31A enclosure, is here shown sealed to the lower housing 70 by means of a recoverable sleeve 101. While this sleeve can be a heat recoverable sleeve, preferably internally coated with heat activatable adhesive, it may be preferable to use a cold shrink tubular closure, for example as shown in the section view of the wall of sleeve 101, FIG. 2a illustrates the use of an elastomeric layer 102 which is held in an expanded state by substantially rigid hold out layer 103, which may for example be formed of as described in U.S. Pat. Nos. 4,035,534, 4,179,320, or 4,135,553, from which it can be released to recover about the joint between the upper housing 100 and lower housing 70 by the action of a liquid disbonding the layers along the bond line between the elastomer layer 102 and the holdout layer 103, or by liquid softening or dissolving the holdout layer itself. A pressure sensitive adhesive layer 104 is preferably provided on the interior surface of the elastomer layer to effect a good seal around the joint between the upper and lower housing which joint can be designed as indicated in the inset to maximise the leak path, thus assisting effective sealing.

An alternative, but less preferred, arrangement can be envisaged in which eight outlet holes (or such other number as may be desired) are provided in the dimensionally stable housing 70, each having a single outlet leg or tube of the necessary length and flexibility. In such an arrangement, the housing itself which need not necessarily be made of polymeric material, could be regarded as the hollow body portion of a breakout article with long flexible outlets according to the present invention.

It will be understood that adhesive coatings, preferably of hot melt adhesive when heat shrinkable articles are used, may be provided as desired on part or all of the interior surface of the breakout articles according to the present invention to assist sealing upon recovery of the outlet portions around cable breakout portions. Suitable adhesives are described, for example in U.S. Pat. No. 4,181,775.

The specific arrangement of the outlet portions or "legs" of the breakout articles is not critical, but it will be appreciated that it is an advantage of the present invention that the specified length and flexibility of the legs which permit convenient individual recovery without accidentally recovering the other leg or legs permits visually and commercially attractive arrangements such as the square positioning of four legs substantially in line with a tubular body portion. This arrangement is particularly preferred as it readily accommodates the 8 drop wire point distribution system for telephones described in FIGS. 2 and 3, and is readily adaptable to other arrangements such as that shown in FIG. 1.

In use, a cable breakout may be prepared as follows using the article as shown in FIGS. 3 and 4.

EXAMPLE

Form a loop in the main cable at the point of splicing. Remove sheath at the top of the loop for a total length of about 20 cms. Clean, abrade and flame brush about 30 cms of the cable sheath either side of the exposed cable region and apply adhesive coated Al foil to protect sheath from scorching. Remove the cap from the main housing and release the sealing means so as to leave the main cable tube 79 undivided. Protect the exposed grease covered wires with a polythene bag and insert the loop through the main cable tube 79 so that sufficient of the exposed wires are accessible above the base of the splice housing.

Bend the main cable tube away from the remaining outlet tubes and wrap the remaining outlet tubes with heat reflecting foil. Press closed the branch out seal (80) and apply retaining channel to make seal between incoming and outgoing portions of main cable. Heat the main cable tube from about 3 cm away from the corrugations down to the end of the tube. Allow the installation to cool for about 3 minutes and check that the adhesive has melted adequately to form a seal. Cut the end (about the last ½-1 cm) off as many legs as required to lead small cables from the bared main cable.

Degrease, clean and prepare the necessary length of drop wire cable, apply adhesive aluminium foil, and degrease the foil prior to installing the drop wire cables in the outlet legs of the device.

Jointing of the conductors of the main and drop wire cables may be carried out at this stage and no further heat shrinking should take place until all of the joints are satisfactory.

Bend the individual drop wire carrying outlets away from the others and shrink down the end 5 cm or so, checking for satisfactory adhesive flow. Repeat for all drop wire carrying outlets.

Replace the housing cap and apply 1 layer of adhesive tape around the joint between the caps and base of the housing. Apply closure sleeve as appropriate to ensure sealing of the joint.

We claim:

1. An article comprising a substantially dimensionally stable planar or hollow body portion, the body portion if hollow having two substantially cylindrical parts assemblable to form the body portion, wherein the body portion has at least two outlet holes and at least two outlet tubes respectively attached to the outlet holes, and the length and flexibility of the outlet tubes is such that at least one of the outlet tubes can be bent away from the other outlet tube(s) to an extent permitting operations to be carried out at least on an end portion of a selected one of the outlet tubes substantially in isolation from the other outlet tube(s).

2. An article comprising a body portion and at least two tubes leading from apertures in the body portion, wherein at least part of at least one of the tubes is formed of polymeric material and is in a temporarily stable expanded state from which it is recoverable towards an unexpanded state, and the length and flexibility of the tubes is such that at least the said one of the tubes can be bent away from the other tube(s) to an extent permitting operations to effect recovery of an expanded part of a selected one of the tubes to be carried out substantially in isolation from the other tube(s).

3. An article according to claim 2 having at least two said tubes each of which can be bent away from the other to the said extent.

4. An article according to claim 2, wherein the said tubes lie substantially side-by-side.

5. An article according to claim 2, wherein the tubes when unflexed lie substantially parallel to each other.

6. An article according to claim 2, wherein the body portion is tubular and the tubes extend from one end thereof substantially in line therewith.

7. An article according to claim 2, wherein at least part of every tube is formed of polymeric material and is in the expanded state and the length and flexibility of the tubes is such that any one of the tubes can be bent away from the other tube(s) to the said extent.

8. An article according to claim 2, wherein each tube which can be bent to the said extent is corrugated at least near its end adjacent to the body portion so as to assist bending.

9. An article according to claim 2, wherein each tube which can be bent to the said extent can be bent at least 90° without blocking the tube.

10. An article according to claim 2, wherein each tube which can be bent to the said extent has substantially uniform average internal diameter over all or most of its length.

11. An article according to claim 2, wherein at least part of each tube has substantially uniform average internal diameter over all or most of its length and is in a temporarily stable expanded state from which it is recoverable towards an unexpanded state.

12. An article according to claim 2, wherein at least part of each tube has substantially uniform average internal diameter and the ratio of the length of the part of the tube having substantially uniform average internal diameter to the said average internal diameter is at least 10:1.

13. An article according to claim 2, wherein at least part of each tube has substantially uniform average internal diameter and the ratio of the length of the part of the tube having substantially uniform average internal diameter to the said average internal diameter is at least 30:1.

14. An article according to claim 2, wherein a free end portion of at least one tube which can be bent to the said extent is in a temporarily stable expanded state from which it is recoverable towards an unexpanded state and has an average internal diameter substantially greater than that of the remainder of the tube.

15. An article according to claim 2 which has been formed of polymeric material as an integral unit.

16. An article according to claim 2 which has been formed by assembly of two or more separate parts.

17. An article according to claim 2, wherein at least one of the tubes has a cable portion pre-installed therein ready for connection to another cable with which the article will be associated in use.

18. An article according to claim 2, wherein the recoverable parts are heat recoverable.

19. An article according to claim 2, wherein the body portion is in the form of a hollow shell capable of receiving therein a portion of an electrical cable from which electrical conductors are to be led off through one or more of the tubes.

20. A kit of parts for making a cable breakout comprising a heat recoverable wraparound sleeve and an article according to claim 2.

21. A kit of parts for making a cable breakout comprising a substantially dimensionally stable housing capable of receiving a portion of a cable and having at least one outlet hole through which conductors may be led off from the cable, and comprising at least one article according to claim 1 or 2.

22. A kit according to claim 21, wherein the body portion of the said article is attached to the said outlet hole.

23. A kit according to claim 21, wherein the housing comprises two portions which are assembleable to enclose the cable portion from which conductors are led off in use, and the kit additionally comprises a recoverable sealing member for sealing the joint between the two housing portions.

24. A kit of parts according to claim 23 wherein the sealing member comprises an elastomeric layer held in an expanded state by adhesion to a substantially rigid outer layer from which the elastomeric layer can be released to recover elastomerically by application of a liquid.

25. A kit of parts for making a cable breakout comprising a substantially dimensionally stable housing capable of receiving a portion of a cable, the housing comprising two substantially cylindrical parts one of which parts has at least two outlet holes through which conductors may be led off from the cable and has attached at least to each of the said two outlet holes respectively outlet tubes of such length and flexibility that at least one of the outlet tubes can be bent away from the other outlet tube(s) to an extent permitting operations to be carried out at least on an end portion of a selected one of the outlet tubes substantially in isolation from the other outlet tube(s), the two parts of the housing being assemblable to enclose the part of the cable from which conductors are led off in use.

26. An enclosure comprising a housing capable in use of receiving part of a cable from which one or more portions are to be divided out, and an article formed of polymeric material comprising a body portion attached to the housing and at least two tubes leading from apertures in the body portion, the length and flexibility of the tubes being such that at least one of the tubes can be bent away from the other tube(s) to an extent permitting operations to be carried out at least on an end portion of a selected one of the tubes substantially in isolation from the other tube(s).

27. An enclosure according to claim 26, wherein the body portion of the said article is partly enclosed in the housing.

28. An enclosure according to claim 22, wherein the housing is a wraparound heat recoverable sleeve which has been recovered about the said body portion.

29. An enclosure according to claim 26, wherein the housing is substantially dimensionally stable and the said article is attached to an outlet hole of the housing.

30. An enclosure according to claim 29, wherein the body portion of the said article is recoverable and has been recovered onto a tubular projection surrounding the outlet hole.

31. An enclosure according to claim 29, wherein the housing is substantially cylindrical and is in two parts which parts are assemblable in use to enclose a portion of a cable from which portions are to be led off through the said article.

32. An enclosure according to claim 31, wherein the parts of the housing have been assembled and are sealed together by a recoverable member which has been recovered about the joint between the housing parts.

33. An enclosure according to claim 26 installed on a cable breakout.

34. A method of making a cable breakout wherein a cable portion is led off through or a connection is made to the free end of a cable portion extending through a tube of an article comprising a body portion and at least two tubes leading from apertures in the body portion, wherein at least part of at least one of the tubes is formed of polymeric material and is in a temporarily stable expanded state from which it is recoverable towards an unexpanded state, and the length and flexibility of the tubes is such that at least the said one of the tubes can be bent away from the other tube(s) to an extent permitting operations to effect recovery of an expanded part of a selected one of the tubes to be carried out substantially in isolation from the other tube(s) whereby that tube is isolated from the other tube of the said article by bending the one or the other to an extent permitting operations to be carried out at least on an end portion of that tube substantially in isolation from the other tube(s) and operations are thereafter carried out on a portion of that tube substantially in isolation from the other tube(s) to seal the tube around the relevant cable portion and/or the said connection.

35. A method according to claim 34 wherein heat is applied to recover a heat recoverable part of the relevant tube or a further heat recoverable article applied thereto independently of any heat recoverable parts of the other tube(s).

* * * * *